(12) United States Patent
Finzer

(10) Patent No.: US 6,419,614 B1
(45) Date of Patent: Jul. 16, 2002

(54) PUNCHING-BENDING MACHINE

(76) Inventor: Heinz Finzer, Entenberg 3, 79843, Loeffingen (DE)

( * ) Notice: Subject to any disclaimer, the term of this patent is extended or adjusted under 35 U.S.C. 154(b) by 0 days.

(21) Appl. No.: 09/341,076

(22) PCT Filed: Sep. 17, 1997

(86) PCT No.: PCT/EP97/05102

§ 371 (c)(1),
(2), (4) Date: Sep. 2, 1999

(87) PCT Pub. No.: WO98/30344

PCT Pub. Date: Jul. 16, 1998

(30) Foreign Application Priority Data

Jan. 8, 1997 (DE) .................. 297 00 192 U

(51) Int. Cl.[7] .......................... B23Q 3/155; B21F 1/00; B21J 13/02
(52) U.S. Cl. ..................... 483/28; 29/33 Q; 72/442; 100/226 R; 100/918
(58) Field of Search ............. 483/28, 29; 29/33 Q, 29/33 J; 100/231, 918, 226 R, 193; 72/442, 446, 405; 83/552, 556

(56) References Cited

U.S. PATENT DOCUMENTS

| | | | | |
|---|---|---|---|---|
| 4,079,617 A | * | 3/1978 | Whiting ........................ | 72/404 |
| 4,089,205 A | * | 5/1978 | Mizumoto et al. ............. | 72/450 |
| 4,160,372 A | * | 7/1979 | Bergman et al. .......... | 72/421 X |
| 4,532,794 A | | 8/1985 | Mauderer | |
| 4,587,830 A | * | 5/1986 | Mills ........................ | 72/442 |
| 5,040,404 A | * | 8/1991 | Henderson et al. ............ | 72/446 |
| 5,140,839 A | * | 8/1992 | Bruns ........................ | 72/405 |
| 5,218,901 A | * | 6/1993 | Imanishi ................. | 100/918 X |
| 5,271,261 A | * | 12/1993 | Bihler et al. ................... | 72/442 |
| 5,330,409 A | * | 7/1994 | Futamura et al. ............. | 483/29 |
| 5,473,926 A | * | 12/1995 | Futamura ..................... | 72/404 |
| 5,551,275 A | * | 9/1996 | Hofele et al. ............. | 72/455 X |
| 5,582,062 A | * | 12/1996 | Sommer ................. | 100/918 X |
| 5,595,111 A | * | 1/1997 | Michael et al. ........... | 72/455 X |
| 5,720,198 A | * | 2/1998 | Nishida et al. ............. | 72/405.1 |

FOREIGN PATENT DOCUMENTS

| | | | | |
|---|---|---|---|---|
| DE | 2737442 | | 3/1979 | |
| DE | 3827985 | * | 2/1990 | .................. 72/404 |
| DE | 4103302 A1 | | 10/1991 | |
| DE | 4027900 A1 | | 3/1992 | |
| DE | 4112571 C1 | | 5/1992 | |
| GB | 206402 | * | 6/1981 | .................. 72/404 |
| JP | 165234 | * | 7/1986 | .................. 72/404 |

OTHER PUBLICATIONS

English Abstract of DE 4103302 A1.
English Abstract of DE 4027900 A1.
English Abstract of DE 2737442.
English Abstract of DE 4112571 C1.

* cited by examiner

Primary Examiner—William Briggs
(74) Attorney, Agent, or Firm—Reed Smith LLP

(57) ABSTRACT

A punching-bending machine is disclosed for manufacturing different workpieces which is outfitted with at least one exchangeable machining module provided with punching-bending tools which can be driven mechanically, hydraulically or pneumatically, wherein the machining module is received by a portal having at least one side wall and a transverse member which can be connected thereto, wherein bearing devices are provided for supporting the machining module

8 Claims, 8 Drawing Sheets

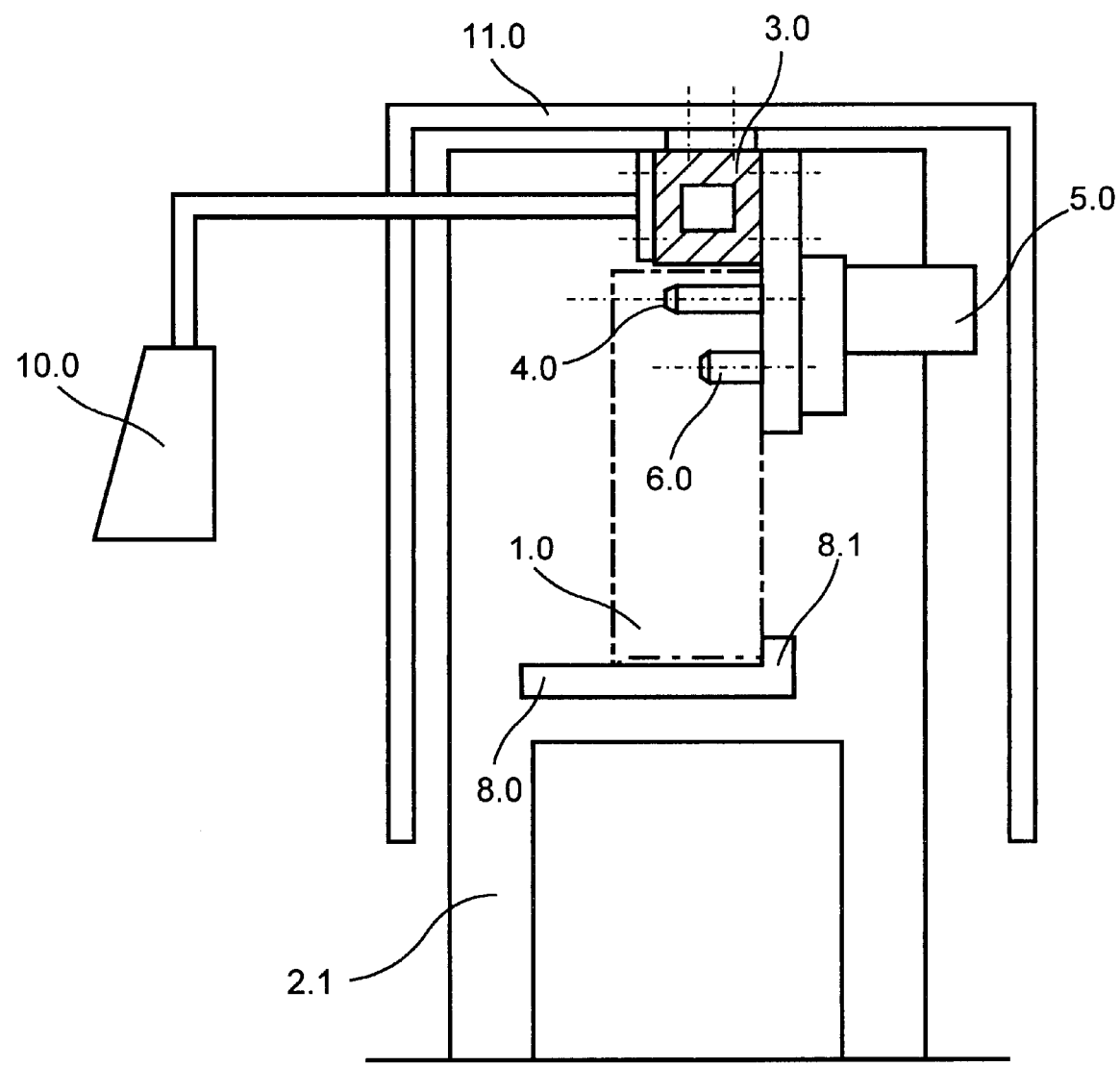
F I G. 2

PUNCHING-BENDING MACHINE

BACKGROUND OF THE INVENTION a) Field of the Invention

The invention is directed to a punching-bending machine for manufacturing different workpieces. The machine is outfitted with punching-bending tools which can be driven mechanically, hydraulically or pneumatically.

b) Description of the Related Art

Modern punching-bending machines should enable versatile manufacturing of a wide variety of structural component parts with the shortest possible changeover times. DE 41 03 302 A1 discloses a punching-bending machine having an exchangeable machining module which is set up for a determined manufacturing task, so that when changing over manufacture it is only necessary to exchange the machining module for a different machining module that is already set up, so that very short idle times of the machines can be realized.

In order to exchange the machining module, the material feed to the machine is at least partially disassembled and the machining module is lifted from the machine base by a lifting mechanism. Another machining module which has already been set up is then lifted onto the machine base and the material feed is reassembled.

OBJECT AND SUMMARY OF THE INVENTION

It is the primary object of the invention to provide a punching-bending machine which can be used in a very versatile manner and which can be refitted in a simple manner within a short refitting time.

This object is met in accordance with the invention by a punching-bending machine for manufacturing different workpieces. The machine is outfitted with at least one exchangeable machining module provided with punching-bending tools which can be driven mechanically, hydraulically or pneumatically. The machining module is received by a portal having at least one side wall and a transverse member which can be connected thereto. Bearing devices are provided for supporting the machining module.

Further, a machine is provided which has a relatively limited space requirement.

A punching-bending machine for manufacturing different workpieces which can be outfitted with at least one exchangeable machining module at which are provided punching-bending tools which can be driven mechanically, hydraulically or pneumatically is provided by the above features. The machining module is received by a portal having at least one side wall and a transverse member which can be connected thereto, wherein bearing devices are provided for supporting the machining module.

A construction with only one side wall results in an L-shaped portal which is open on one side. It is possible to arrange a base unit of this kind in such a way that it is supplemented by another base unit of the above-mentioned type which is arranged in a mirror-inverted manner to form a closed portal.

However, for machines which are designed from the outset to receive a plurality of machining modules, a construction with two side walls that can be connected by a transverse member and accordingly form a closed portal are advantageous because the maximum bending moments occurring in the side walls and transverse members are smaller.

The portal is advantageously suitable for receiving a plurality of machining modules so as to be able to carry out different manufacturing tasks in a versatile manner. The construction of the portal makes it possible to dock the machining modules at the machine in a simple manner by means of conventional industrial trucks, e.g., fork lifts.

A material feed or draw-in unit can be arranged at a side wall and can remain completely assembled even when the machining module is being changed because the side walls are not affected when the machining module is changed. Material draw-in units can also be arranged at the two side walls in order to supply material from both sides.

When the transverse member is provided in the upper area of the side walls, a closed portal having the shape of a tilted C results. However, the transverse member can also be provided in a central area of the side walls, so that an H-shaped portal results. It is essential only that the machining modules can be placed in the intermediate space between the side walls.

A second transverse member can be provided, wherein one transverse member can be arranged above the machining module and the second transverse member can be arranged below the machining module. This construction is highly rigid and allows the lower transverse member to be used as a bearing device for the machining modules, which will be discussed in the following.

The machining modules can be received by means of a guide rail as a bearing device. In this arrangement, the machining modules need only be placed on the guide rail at the correct height by a transport device and can then be inserted into the portal without difficulty. Therefore, no lifting mechanism is required to mount the machining modules.

The guide rail can be provided at a side wall or at a transverse member. Of course, a plurality of guide rails can also be provided at different structural component parts.

In order to ensure the correct position of the machining module, a stop as well as a centering device can be provided. The centering device for centering the machining module can be formed at a side wall or transverse member. The centering device can have a receiving mandrel. The latter can be provided at the machining module and can engage in a recess at the portal, or vice versa. A stop can be formed at a transverse member, wherein this stop can also be formed by the transverse member.

At least one driving device can be mounted at a transverse member for driving the machining module. This driving device can transmit the driving force to the machining module mechanically, hydraulically or pneumatically.

The positioning of the driving device is advantageously adjustable. When a plurality of machining modules are mounted in the portal, the driving device can be made to engage with different machining modules. The machining modules can be connected with one another in a driving connection, so that the driving energy is transmitted from one machining module to the next. As a result of the versatile introduction of driving energy mentioned above, this driving energy can be introduced where the highest driving output is desired.

At least one transverse member for supplying energy and/or control lines can be constructed so as to be hollow. This arrangement has numerous advantages. On the one hand, exposed lines which could interfere with the operation of the machine are avoided. On the other hand, the lines are optimally protected against damage. When oil or compressed air is guided through the transverse member, a good cooling of this media is achieved by the large radiating surface of the transverse member which is usually metallic, so that a separate cooling device may not be necessary in some cases.

The connection of the above-mentioned lines to the machining modules can advisably be carried out via plug-in connections. These plug-in connections can be provided at the machine or at the machining module in such a way that the connection to the lines is made automatically when the machining modules are moved into the final position. According to the preferred embodiment form of the machine, the machining modules are pushed into the final position by means of guide rails. In this arrangement, plug-in connections can be realized in a simple manner, wherein these plug-in connections are automatically connected when the machining modules are pushed in. In this way, assembly is greatly simplified.

A transverse member can be provided with T-grooves for displaceably receiving devices, e.g., driving devices. Receptacles can be provided in the space between the side walls and under the machining modules for receiving devices such as hydraulic units, pneumatic units, material wind-off units, control devices, frequency converters and parts containers for receiving finished parts, so that a particularly space-saving arrangement is achieved.

The punching-bending machine according to the invention can be coupled with other machines by means of the side walls to form a machining center. However, in an advantageous further development, the punching-bending machine according to the invention can also be expanded by using at least one additional transverse member in the portal.

Further, a transverse member can be provided with a connection device for connecting another machine at a determined angle, so that a machining center can be realized diagonally. An additional transverse member can be connected by means of an intermediate piece which can be connected to the existing transverse member.

The portal-shaped arrangement of the punching-bending machine is highly suitable for the integration of a protective device which is partially formed by the portal itself. A cabin which is closed to a great extent is provided as a protective device by means of at least one additional movable part.

Fastening plates can be provided at the side walls or transverse members in order to fasten the punching-bending machine to the floor, ceiling or a girder. Further, control consoles and the like can be fastened in a simple manner to the portal. Tools of other systems can also be used by means of adapter plates at the machining modules in order to make use of the aforementioned advantages for fast refitting of the machines.

Preferred embodiment examples of the punching-bending machine according to the invention are described in the following.

BRIEF DESCRIPTION OF THE DRAWINGS

In the drawings:

FIG. 2 shows a side view of the base unit in section;

DESCRIPTION OF THE PREFERRED EMBODIMENTS

Figure 1:
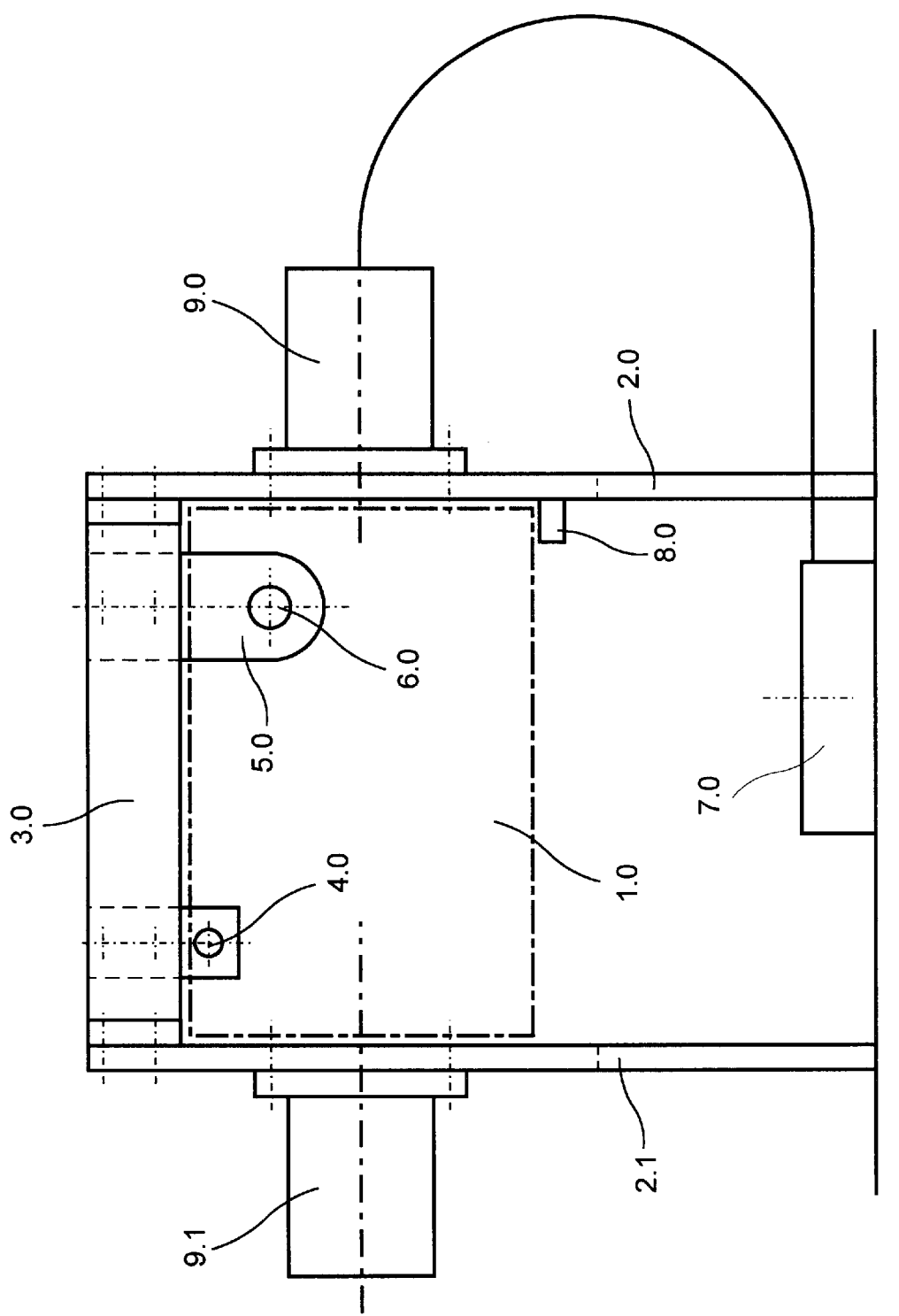
FIG. 1 is a front view showing the basic construction of a base unit of the machine.

The basic construction of the punching-bending machine according to the invention can be seen clearly in FIG. 1. FIG. 1 shows a base unit of this machine. A machining module 1.0 is received in a portal of the machine which is formed by two side walls 2.0 and 2.1 and by a transverse member 3.0 which can be connected to the latter.

Draw-in units 9.0, 9.1 are fitted to the side walls 2.0, 2.1, wherein material is fed to the machining module 1.0 from a wind-off unit 7.0 arranged below the machining module 1.0 by means of the draw-in units 9.0, 9.1. A guide rail 8.0 is provided at the right-hand side wall 2.0 and makes it possible for the machining module 1.0 to be received in the portal in a simple manner as will be explained more clearly with reference to FIG. 2.

The machining module 1.0 inserted into the portal is supported by the above-mentioned guide rail 8.0 and a centering device 4.0. This centering device 4.0 is provided at the transverse member 3.0 and has a dowel pin or locating pin (not shown) which engages in a corresponding recess in the machining module 1.0.

In this embodiment form, the driving of the machining module 1.0 is carried out mechanically by means of a driving unit 5.0 having a pinion 6.0 which engages with the toothed wheel (not shown) of the machining module 1.0. The driving unit 5.0 is supported at the transverse member 3.0 so as to be displaceable in T-grooves (not shown). The supply lines required for the driving unit 5.0 and the machining module 1.0 are guided through the hollow transverse member.

The guide rail 8.0 provided at the side wall 2.0 is shown clearly in FIG. 2. This guide rail 8.0 makes it possible to place the machining module 1.0 on the guide rail 8.0 from the front in a simple manner. In this case, the machining module 1.0 need only be pushed back until the back wall of the machining module 1.0 reaches the stop 8.1 which is formed in one piece with the guide rail 8.0 in this embodiment example. The desired position of the machining module 1.0 is ensured by the above-mentioned centering device 4.0.

The additional structural component parts shown in the Figure are parts of a protective cabin 11.0 and a control console 10.0 which, like the protective cabin 11.0, is fastened to the transverse member 3.0.

Figure 3:
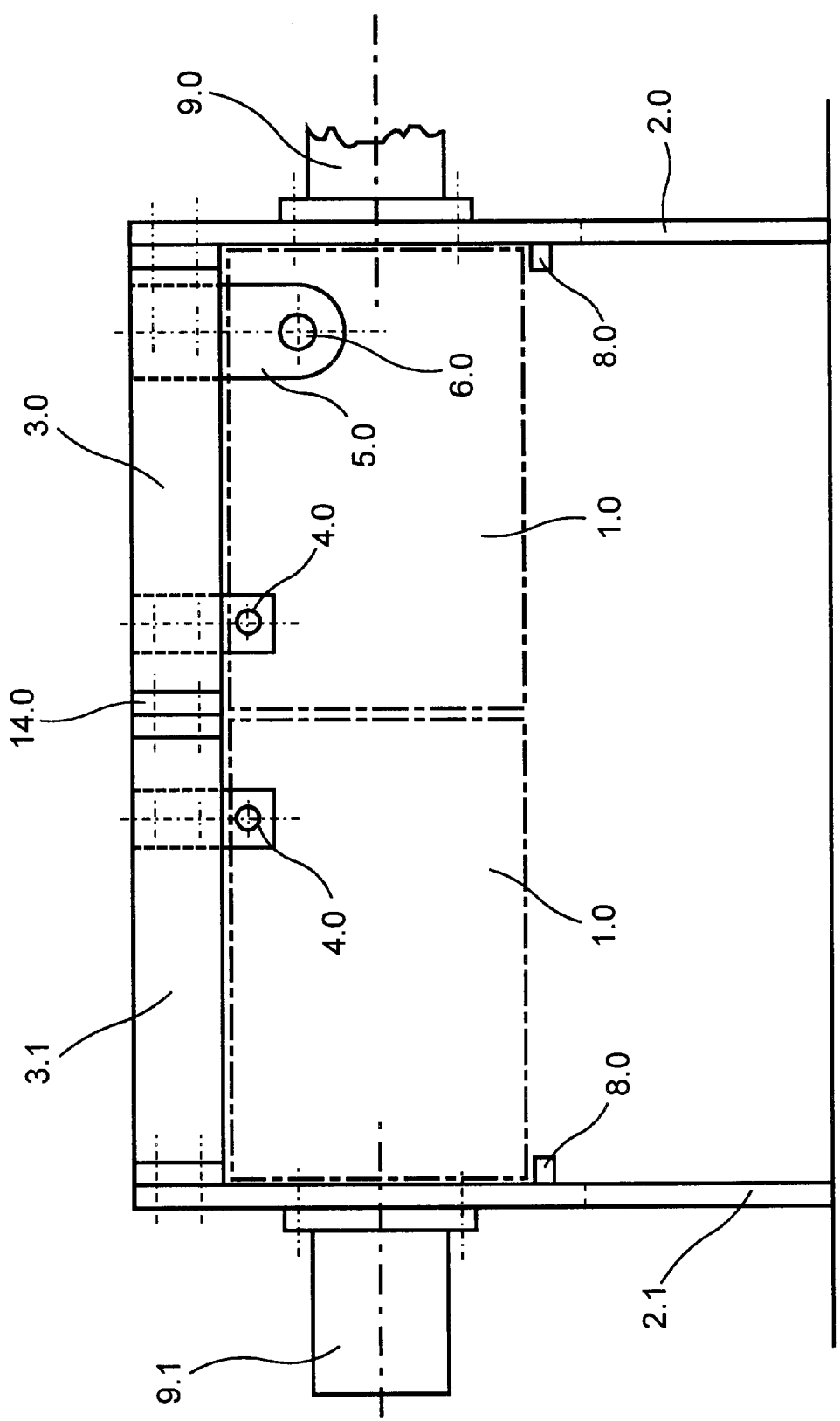
FIG. 3 is a front view of the base unit in expanded form for receiving two machining modules.

FIG. 3 shows an expanded machine which is suitable for receiving two machining modules 1.0. For this purpose, the portal is lengthened in a simple manner by means of another transverse member 3.1 which is connected to the first transverse member 3.0 by an intermediate piece 14.0. The second machining module 1.0 arranged on the left-hand side is also supported, by means of a guide rail 8.0, at the left-hand side wall 2.1 and at a centering device 4.0. In this embodiment form, the driving of the machining modules 1.0 is carried out by means of a driving unit 5.0 which drives the right-hand machining module 1.0, the driving energy being transmitted from the right-hand machining module 1.0 to the left-hand machining module 1.0. However, a second driving unit can also be arranged in the same manner and can be made to engage with the second machining module.

Figure 4:
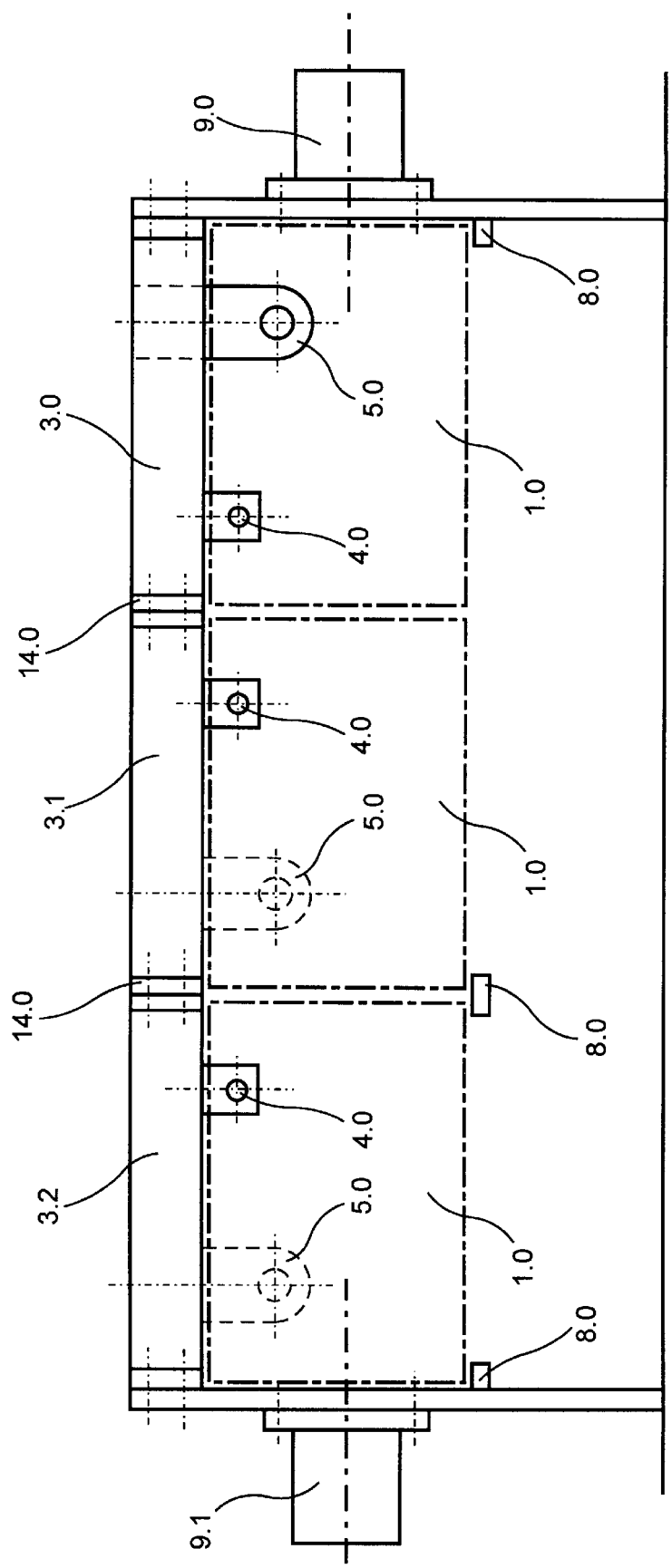
FIG. 4 shows a front view of the base unit in a further expanded form for receiving three machining modules.

FIG. 4 shows another expansion of the portal for receiving three machining modules. For this purpose, a third transverse member 3.2 is connected to the second transverse member 3.1 by means of another intermediate piece 14.0. A guide rail 8.0 is likewise provided for supporting the middle machining module 1.0. Together with the corresponding intermediate piece 14.0, this guide rail 8.0 forms a unit, so that the weight placed upon the latter is received by the intermediate piece 14.0 and therefore by the transverse members 3.0 to 3.2. In the embodiment example according to FIG. 4, three driving units 5.0 are provided, each of which engages with a machining module 1.0.

According to a different embodiment variant shown in FIG. 8, a lower transverse member 18.0 is arranged below the machining modules. This lower transverse member 18.0 is highly suitable for forming guide rails and generally for supporting the machining modules.

Figure 5:
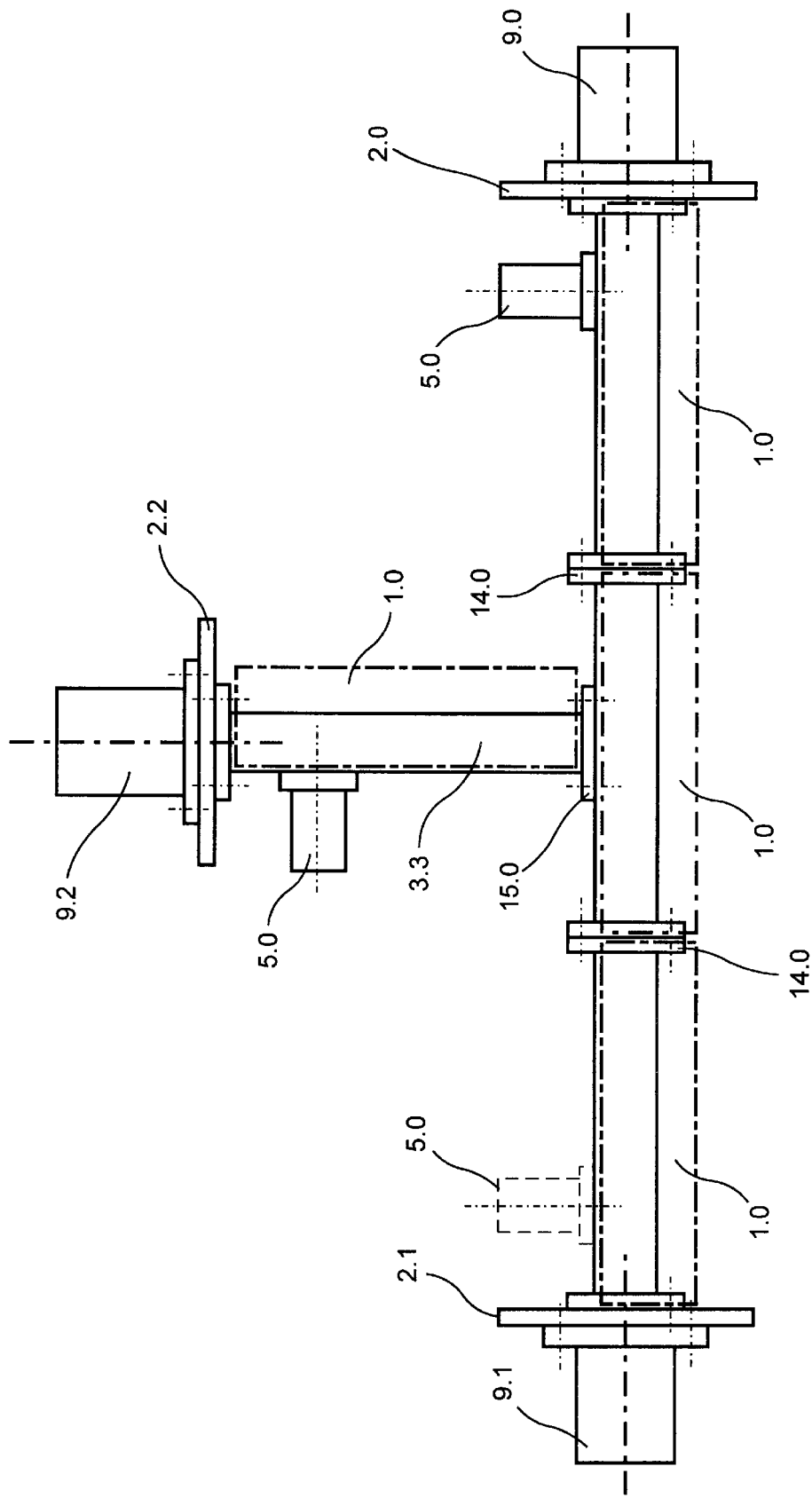
FIG. 5 shows a top view of the machine according to FIG. 4 which is further expanded by a portal connected at a right angle.

FIG. 5 shows another expanded machine in which, proceeding from the machine according to FIG. 4, another, fourth transverse member 3.3 is connected in the middle of the center transverse member 3.1 at a right angle via an intermediate piece 15.0. This fourth transverse member 3.3 is supported by a third side wall 2.2. The driving of the machining module 1.0 mounted below the fourth transverse member 3.3 is carried out via a driving unit which is provided in a known manner at the transverse member 3.3. The material feed to this machining module 1.0 is carried out by means of a third draw-in unit 9.2.

In a different embodiment variant, not shown, the intermediate piece is capable of transmitting driving power from the machining module arranged below the transverse member to which the intermediate piece is connected to the machining module mounted at a right angle. This transmission is carried out by means of a gear train which engages with the central wheels of the two machining modules.

However, when the machine is driven hydraulically or pneumatically, it is only necessary that the corresponding pressure line is branched off into the connected transverse member by means of the intermediate piece.

Figure 6:
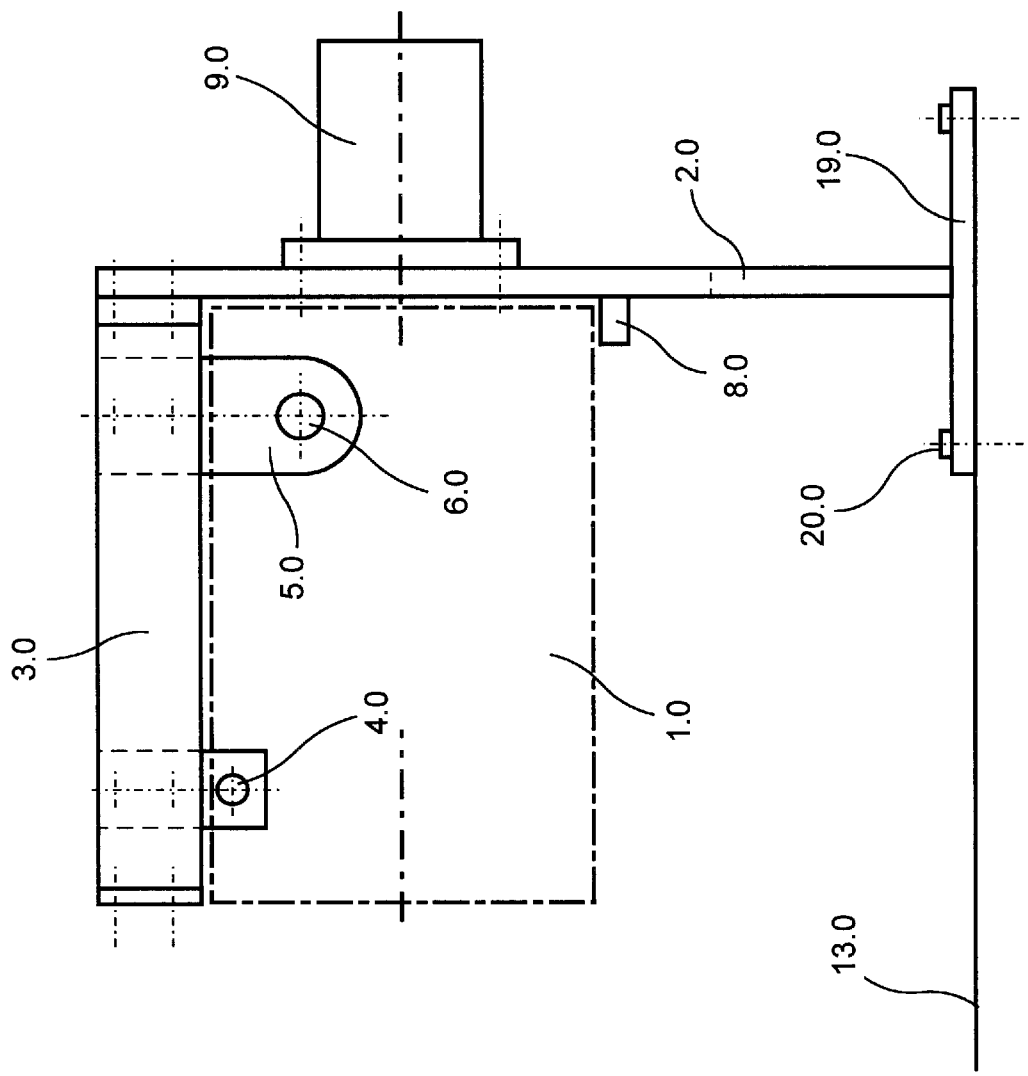
FIG. 6 shows a front view of a second embodiment example of the base unit with a portal which is open on one side.

FIG. 6 shows another embodiment example which differs from the embodiment example already described only in that the portal has an open construction. In this construction, the transverse member 3.0 is supported only at one side wall 2.0, resulting in an open L-shaped portal. The side wall is anchored to the floor 13.0 by means of a fastening plate 19.0 by bolts 20.0. The side wall 2.0 and the transverse member 3.0, that is, the portal, can be constructed in such a way that it can receive, both from the right-hand side and left-hand side, a machining module 1.0 which is accessible from the front. This means that an identical portal, rotated by 180°, can be erected to the left of the machine shown in the drawing, wherein the transverse members can be connected by means of an intermediate piece and the machine can be supplemented to form a portal machine with two side walls for receiving two machining modules. Naturally, further expansion through the addition of additional transverse members is also possible.

Figure 7:
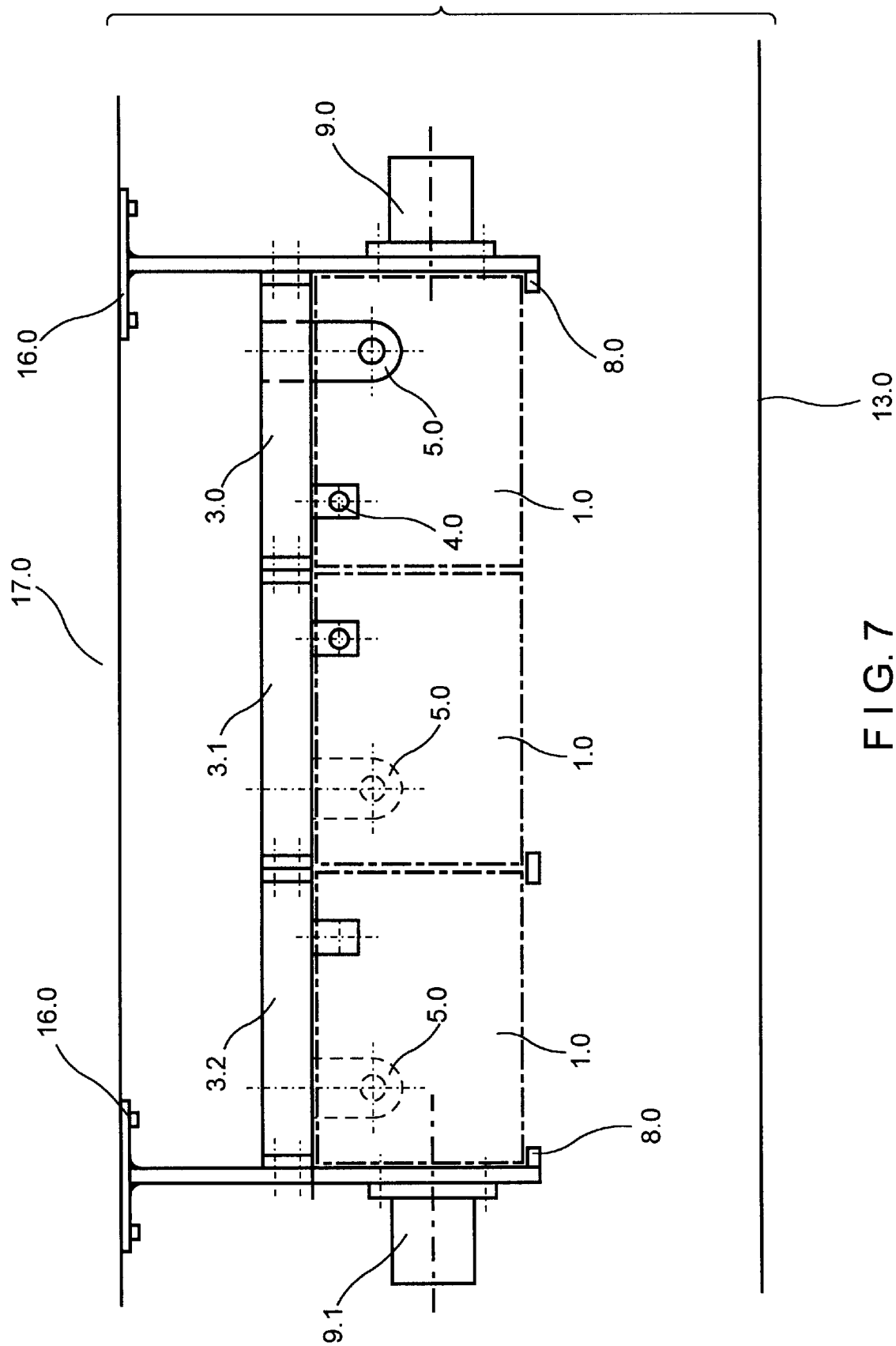
FIG. 7 shows a front view of a third embodiment example similar to the machine according to FIG. 4 for suspended mounting at a girder.

FIG. 7 shows a machine which basically corresponds to the machine according to FIG. 4, but is intended for suspended mounting instead of vertical mounting. The transverse members 3.0 to 3.2 are provided in a central area of the side walls 2.0, 2.1 which are fastened to a support or girder 17.0 by means of fastening plates 16.0.

Figure 8:
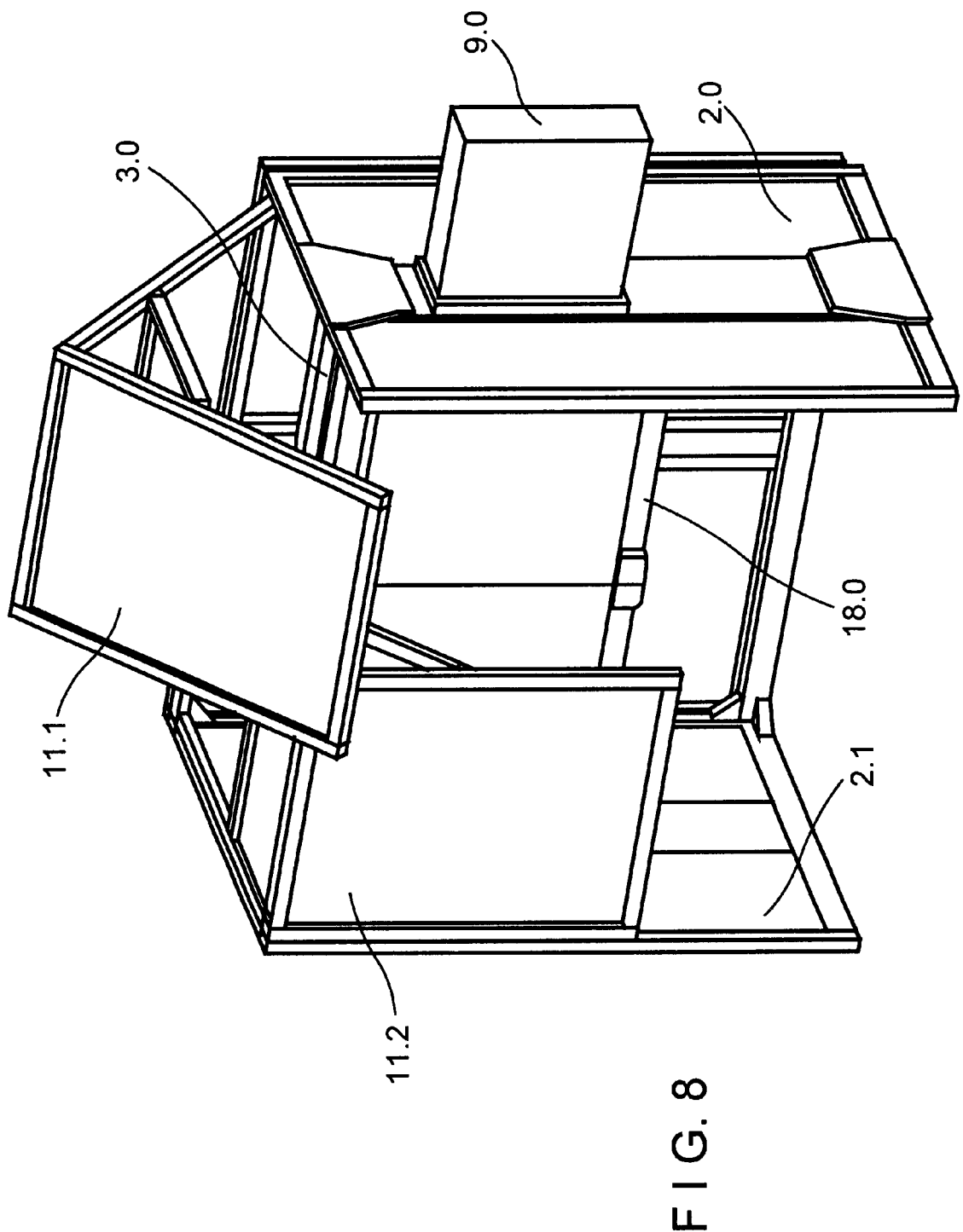
FIG. 8 shows a fourth embodiment example with a partially folded up protective cabin.

FIG. 8 shows a three-dimensional view of a machine with protective cabin 11.0 which comprises two swivelable elements 11.1 and 11.2 to ensure easy access to the machining module 1.0.

While the foregoing description and drawings represent the present invention, it will be obvious to those skilled in the art that various changes may be made therein without departing from the true spirit and scope of the present invention.

What is claimed is:

1. In a punching-bending machine for manufacturing different workpieces an improvement comprising:

at least one exchangeable machining module capable of mounting at least punching or bending tools driven mechanically, hydraulically or pneumatically thereon and being dimensioned to be quickly dockable for operation in a portal, and quickly exchangeable with other modules in said portal thereafter, to provide short idle times when refitting the punching-bending machine for different operations, said portal comprising:

at least one side wall;

a transverse member connected to said at least one side wall;

a centering device;

bearing devices being provided for supporting the machining module;

an adjustable and displaceable driving device capable of transmitting a driving force to the exchangeable machining module mechanically, hydraulically or pneumatically and mounted to said portal for driving said at least one exchangeable module;

wherein the bearing devices comprise guide rails which together with the centering device provide for centering the exchangeable machining module and guiding the exchangeable machining module into a working position upon docking of the exchangeable machining module with the portal, and control lines located in the portal, wherein upon docking said control lines are automatically connected to the exchangeable machining module.

2. The punching-bending machine according to claim 1, wherein a second side wall which can be connected with the transverse member is provided.

3. The punching-bending machine according to claim 1, wherein a second transverse member is provided, wherein one transverse member is arranged above the machining module and wherein the second transverse member is arranged below the machining module.

4. The punching-bending machine according to claim 1, wherein at least one transverse member can be outfitted with a connection device for connecting another machine at a determined angle.

5. The punching-bending machine according to claim 1, wherein the machine can be expanded by using at least one additional transverse member in the portal.

6. The punching-bending machine according to claim 1, wherein the bearing device has a stop for the machining module.

7. The punching-bending machine according to claim 1, wherein at least one driving device can be mounted at a transverse member for driving a machining module.

8. The punching-bending machine according to claim 1, wherein the positioning of the driving device is adjustable and the driving device can be made to engage with different machining modules.

* * * * *